United States Patent
Ogashiwa

(10) Patent No.: US 7,810,948 B2
(45) Date of Patent: Oct. 12, 2010

(54) ILLUMINATION DEVICE HAVING ORGANIC ELECTRO LUMINESCENCE (EL) PANELS

(75) Inventor: Yuta Ogashiwa, Yamagata (JP)

(73) Assignee: Yamagata Promotional Organization for Industrial Technology, Yamagata-shi, Yamagata (JP)

( * ) Notice: Subject to any disclaimer, the term of this patent is extended or adjusted under 35 U.S.C. 154(b) by 210 days.

(21) Appl. No.: 12/019,053

(22) Filed: Jan. 24, 2008

(65) Prior Publication Data

US 2008/0180936 A1     Jul. 31, 2008

(30) Foreign Application Priority Data

Jan. 26, 2007   (JP)  .............. 2007-016528

(51) Int. Cl.
*F21V 1/00* (2006.01)
(52) U.S. Cl. .................... 362/239; 362/84; 362/427
(58) Field of Classification Search ............... 362/427, 362/227, 233, 234, 236, 239, 249.07, 249.1, 362/285–289, 84
See application file for complete search history.

(56) References Cited

U.S. PATENT DOCUMENTS 6,565,231 B1 * 5/2003 Cok .................... 362/653
7,108,392 B2 * 9/2006 Strip et al. .............. 362/145
2002/0021566 A1   2/2002   Lee
2005/0094394 A1   5/2005   Padiyath et al.
2005/0248935 A1   11/2005   Strip et al.

FOREIGN PATENT DOCUMENTS

| JP | 9-311737 A | 12/1997 |
| JP | 10-319879 A | 12/1998 |
| JP | 2003-7450 A | 1/2003 |
| JP | 2004-234868 A | 8/2004 |

OTHER PUBLICATIONS

European Search Report dated May 7, 2010, issued in corresponding European Patent Application No. 08001285.9.

* cited by examiner

*Primary Examiner*—Gunyoung T Lee
(74) *Attorney, Agent, or Firm*—Westerman, Hattori, Daniels & Adrian, LLP

(57) ABSTRACT

An illumination device is provided that has a superior decorative effect achieving a favorable dramatic effect and atmosphere. Sub-panels (2, 3, 4, 5) having the same shape as a main panel (1) are mounted pivotally to each side of the rectangular main panel (1) via hinges (6). Surface-emitting parts (1a, 2a, 3a, 4a, 5a) formed of organic EL elements are mounted on the main panel (1) and each of the sub-panels (2, 3, 4, 5). By changing a set angle between the main panel (1) and each of the sub-panels (2, 3, 4, 5) and by independently controlling the lighting of each surface-emitting part (1a to 5a), a favorable dramatic effect and atmosphere can be created.

8 Claims, 5 Drawing Sheets

ILLUMINATION DEVICE HAVING ORGANIC ELECTRO LUMINESCENCE (EL) PANELS

BACKGROUND OF THE INVENTION

1. Field of the Invention

The present invention relates to an illumination device that uses a surface-emitting light source typified by an organic EL (electro luminescence) element.

2. Description of the Related Art

The history of illumination devices is long, and many types have been used conventionally, such as filament light bulbs as point light sources, and fluorescent lights as line light sources. Furthermore, such an illumination device has been proposed, that has a structure in which a multitude of LEDs are arranged in a plane to simulate a surface-emitting light source. In illumination devices using the aforementioned types of light sources, each light source must be mechanically held and accessory components such as a socket must be equipped to supply power to each light source individually, which leads to a problem that the cost and the size of the illumination device are increased.

Recently, organic EL elements that function as surface-emitting light sources have been attracting attention. Such organic EL elements are driven with a low voltage, resulting in a high luminance efficiency, and have reduced weight and thickness, so that the organic EL elements are used in flat panel displays (FDP) in some of portable devices. Furthermore, devices using the organic EL elements as surface-emitting light sources for backlights in liquid crystal display elements, for example, are provided.

On the other hand, organic EL elements can emit lights of R (red), B (blue), and G (green) according to a selection of materials used in the EL light emitting layer. Accordingly, by using each of the emission colors singly or a combination of two or more of the emission colors, a white color or an emission color similar to white can be achieved. Therefore, the organic EL element configured as a surface-emitting light source (light emitting panel) can be used for decorative light sources, high-efficiency light sources for illuminating a room, or the like.

Use of organic EL elements as a surface-emitting type illumination device taking advantage of the aforementioned beneficial properties of organic EL elements is disclosed in Japanese Patent Application Laid-Open No. 2003-7450 and Japanese Patent Application Laid-Open No. 2004-234868.

In Japanese Patent Application Laid-Open No. 2003-7450 and Japanese Patent Application Laid-Open No. 2004-234868, however, the main objects are to prevent generation of uneven brightness in a case where the organic EL element is used as the surface-emitting light source, and merely the use of the organic EL elements as a simple surface-emitting light source is disclosed.

SUMMARY OF THE INVENTION

It is an object of the present invention to provide an illumination device in which surface-emitting light sources typified by the organic EL elements are connected to one another in a specific configuration and an angle of each light emitting surface can be changed according to preference, to thereby provide an illumination device that produces decorative effect achieving a favorable dramatic effect and atmosphere.

According to one aspect of the present invention, the illumination device for solving the aforementioned problems includes a main panel at least one surface of which constitutes a surface-emitting part, and a sub-panel which is pivotally supported by the main panel via a connecting part and at least one surface of which constitutes a surface-emitting part. The sub-panel is pivotally movable around a side or a point as an axis in relation to the main panel via the connecting part.

In this case, the main panel is preferably formed in a rectangular shape with four sides supporting via the connecting parts the four sub-panels pivotally, respectively. Also, the four sub-panels are each preferably formed in a rectangular shape. The surface-emitting part is desirably made up of organic EL elements.

Such a structure can also be favorably adopted that at least one of the main panel and the sub-panel has both surfaces constituted by the surface-emitting parts. In a preferred embodiment, the main panel is provided with a case for housing a light driving power source on a back side of the surface-emitting part, and a portion of the case is provided with a support member that supports the entire illumination device.

In the illumination device having the structure described above, it is further desirable that each of the surface-emitting parts in the main panel and the sub-panel is independently controlled to emit light.

With the structure described above, the main panel having at least one surface constituting the surface-emitting part supports the sub-panel having at least one surface constituting the surface-emitting part pivotally via the connecting part. The connecting part is pivotally movable around a side or a point as an axis. Therefore, an illumination device can be provided in which an angle (position) of the sub-panel in relation to the main panel can be optionally selected.

With the structure in which the sub-panels formed in a rectangular shape, for example, are supported via the connecting parts pivotally at four sides of the main panel formed in the same rectangular shape, a configuration of the illumination device can be set according to preference in a shape in which each surface-emitting part is flat, a box shape in which the surface-emitting parts are arranged inside of the box shape, a box shape in which the surface-emitting parts are arranged outside of the box shape, or the like.

In addition, by providing the connecting part with a ball joint function of pivotally moving around a point as a axis, the position of each sub-panel can be set to even more irregular configurations. In addition, by structuring the illumination device such that the lighting of each surface-emitting part on the main panel and the sub-panels can be independently controlled, an illumination device can be provided that produces decorative effect achieving a favorable dramatic effect and atmosphere.

DESCRIPTION OF THE PREFERRED EMBODIMENTS

Figure 1:
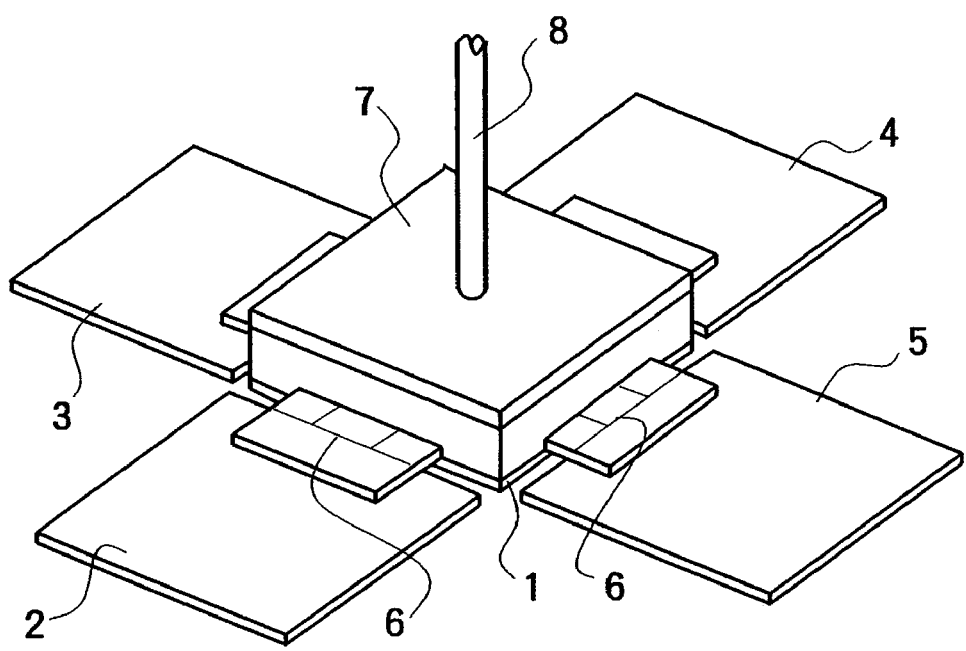
FIG. 1 is a perspective diagram of an illumination device according to a first embodiment of the present invention as seen from diagonally above.
Figure 2:
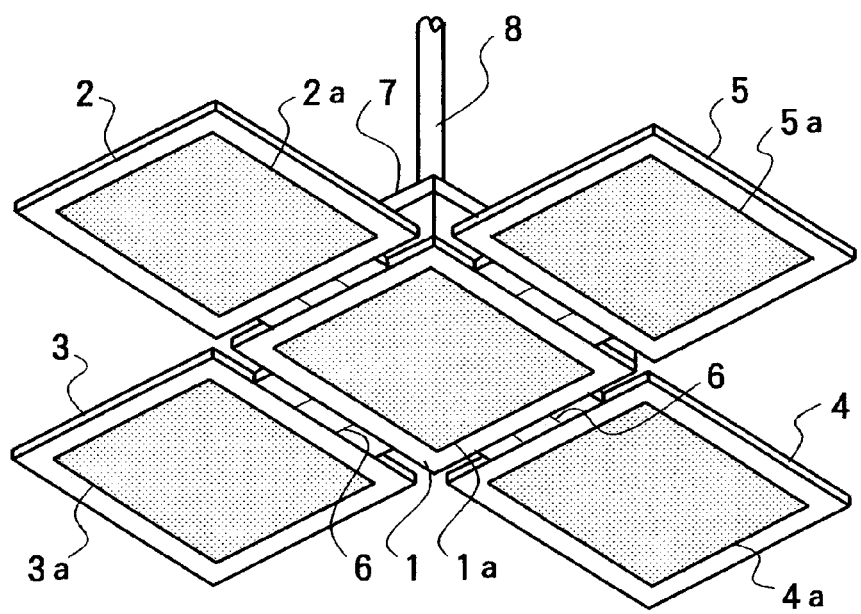
FIG. 2 is a perspective diagram of the illumination device as seen from diagonally below.
Figure 3:
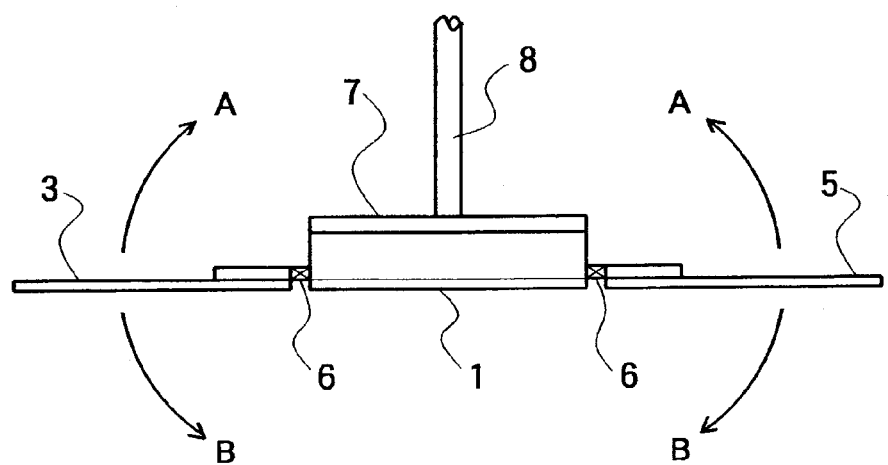
FIG. 3 is a side view of the illumination device as seen from the side.
Figure 4:
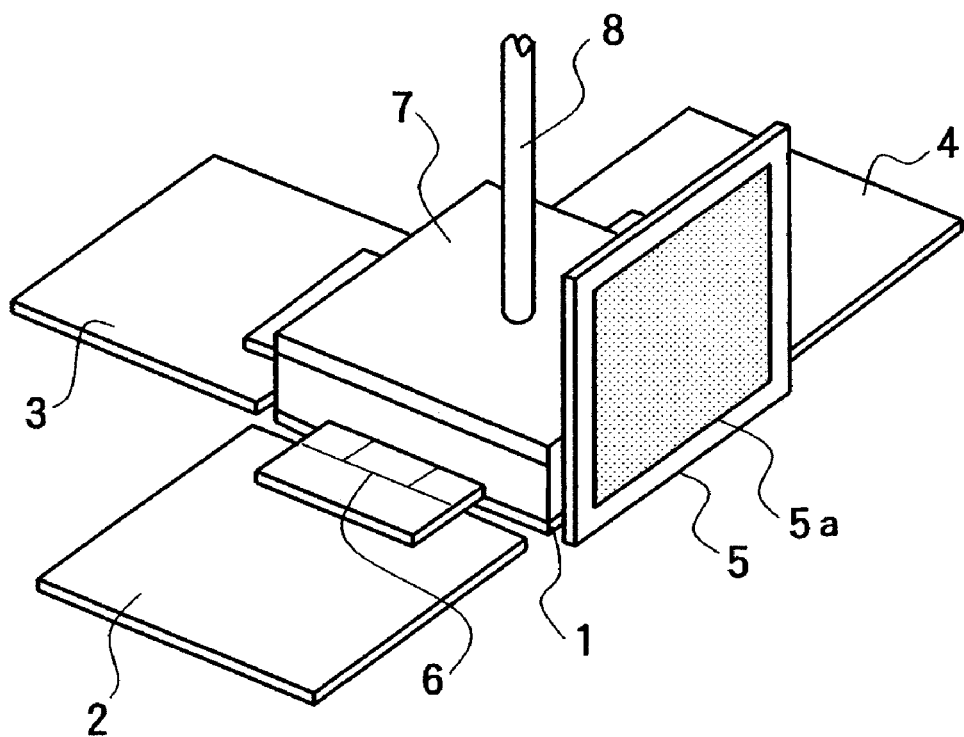
FIG. 4 is a perspective view showing a state in which one sub-panel is lifted upward.

Hereinafter, an illumination device according to the present invention is described through embodiments shown in the figures. FIGS. 1 to 4 show a first embodiment of the present invention. FIG. 1 is a perspective diagram of the illumination device as seen from diagonally above in a state where each sub-panel is spread out horizontally. FIG. 2 is a perspective diagram of the illumination device as seen from diagonally below. FIG. 3 shows a side view of the illumination device. FIG. 4 is a perspective view showing a state in which one sub-panel is lifted upward.

As shown in FIG. 1 and FIG. 2, a rectangular main panel 1 is provided in a center of the illumination device and a rectangular surface-emitting part 1a is mounted on a bottom surface of the main panel 1 with a prescribed distance from an outer circumference of the main panel 1 (in other words, the rectangular surface-emitting surface 1a is mounted in a frame-like shape on the bottom surface of the main panel 1.).

Furthermore, rectangular sub-panels 2, 3, 4, 5 are mounted pivotally along four sides of the main panel 1 via connecting parts 6, respectively. In the present embodiment, as shown in FIG. 2, rectangular surface-emitting parts 2a, 3a, 4a, 5a, are each mounted in a frame-like shape on bottom surfaces of the sub-panels 2, 3, 4, 5, respectively, in the same manner as the surface-emitting part 1a of the main panel 1.

The main panel 1 and the sub-panels 2, 3, 4, 5, are each formed in a square shape and have dimensions almost identical to one another. Each of the surface-emitting parts 1a, 2a, 3a, 4a, 5a provided to the main panel 1 and the sub-panels 2, 3, 4, 5 is also formed in a square shape and structured to have dimensions almost identical to tone another. In the present embodiment, each of the surface-emitting parts 1a, 2a, 3a, 4a, 5a, is made up of organic EL elements.

The organic EL elements that make up the surface-emitting parts have, for example, a structure in which an organic film including a light emitting layer, on which a counter electrode is formed as a solid electrode, is formed on a transparent electrode such as an ITO formed as a solid electrode on a transparent glass substrate. A back side of each organic EL element made up of the transparent electrode, the organic film, and the opposing electrode is sealed with a sealing member jointed to a perimeter of the glass substrate.

In a case where the organic EL elements that make up the surface-emitting parts have a relatively large surface area, a structure is desirable in which each of the organic EL elements is divided into a plurality of devices having a small surface, and transparent electrodes and counter electrodes in the EL elements are connected serially or in parallel to one another. With such a configuration, an effect of a voltage drop caused by high electrical resistance of the ITO can be reduced, so that uneven light emission can be effectively prevented.

The connecting parts 6 that support the sub-panels 2, 3, 4, 5 pivotally with respect to the main panel 1 are each formed by hinges with identical structures, so that each of the sub-panels 2, 3, 4, 5 is structured to be able to be pivotally movable around a side as an axis independently from each other by up to 180 degree in relation to the main panel 1, as shown by the arrows A, B of FIG. 3.

Each hinge is formed to have a suitable resistance against a pivotal movement in order to maintain a position of each sub-panel after pivotal movement around a side as an axis. FIG. 4 shows an example in which hinges are used as the connecting parts 6 to lift a side of the free end of the sub-panel 5 vertically upward.

The main panel 1 located in the center is mounted to a bottom part of a case 7 that has a rectangular periphery and a small height (oblately). A driving power source that supplies a light driving current to the organic EL elements that make up each surface-emitting part 1a, 2a, 3a, 4a, 5a, a remote control signal receiving part, and the like (not shown) are housed in the case 7.

A supporting member that supports the entire illumination device, in other words, a pipe 8 hanging from a ceiling, is mounted in a center of a top surface of the case 7.

The illumination device is structured such that a driving current is supplied from the driving power source housed in the case 7 to the surface-emitting parts 1a, 2a, 3a, 4a, 5a made up of the organic EL elements in each of the sub-panels 2, 3, 4, 5 via current supply lines (not shown) arranged through each of the hinge portions serving as the connecting parts 6. In this case, it is desirable that the current supply lines are inserted through, for example, a hollow shaft as a support shaft of each of the hinges.

With the illumination device having the aforementioned structure, a set angle of each of the sub-panels 2, 3, 4, 5 can be optionally changed by using the hinges as the connecting parts 6. In addition, the aforementioned unique operation effect can be achieved by independently controlling the lighting of each surface-emitting part in the main panel and the sub-panels by a remote control or the like.

Figure 5:
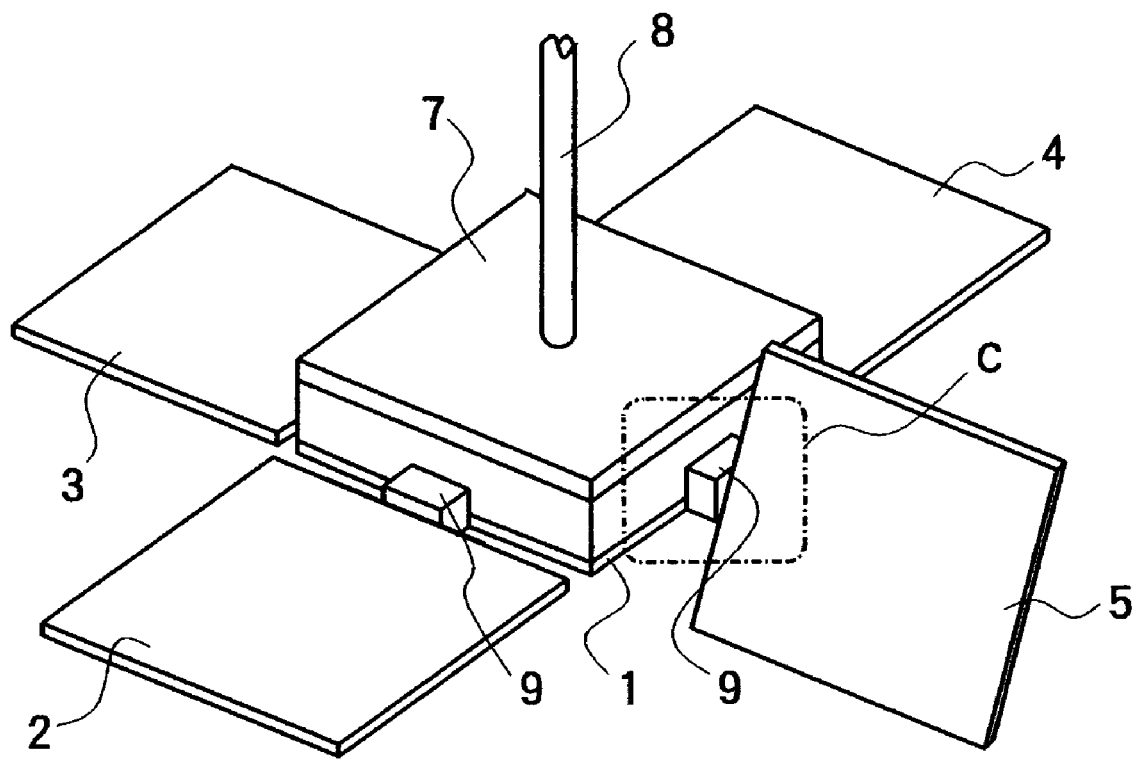
FIG. 5 is a perspective view of the illumination device according to a second embodiment of the present invention as seen from diagonally above.
Figure 6:
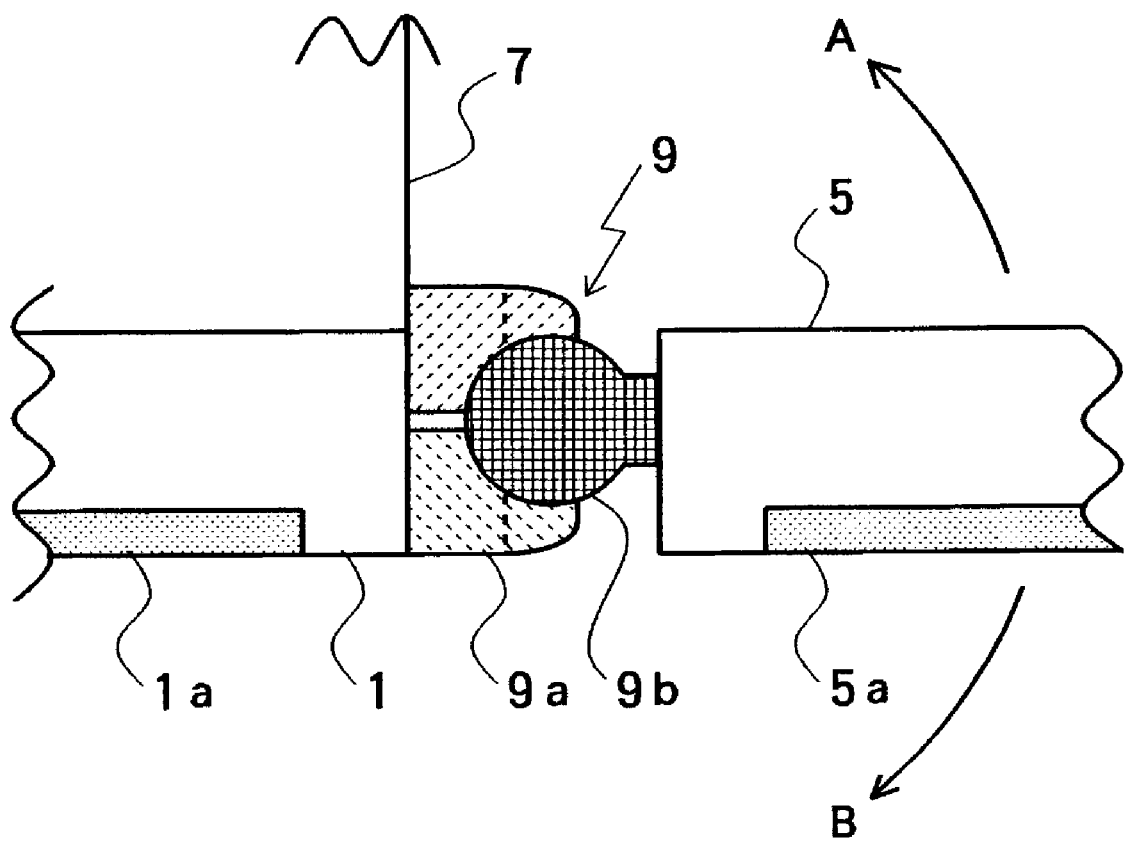
FIG. 6 is an enlarged cross-partial view of a portion surrounded by the dotted line C in FIG. 5.

Next, FIG. 5 and FIG. 6 show a second embodiment of the illumination device according to the present invention. FIG. 5 is a perspective view of the illumination device as seen from diagonally above and FIG. 6 is an enlarged cross-partial view showing a portion surrounded by the dotted line C in FIG. 5, that is, a connecting portion between the main panel and a sub-panel. In FIG. 5 and FIG. 6, parts having the same function as parts already shown in FIGS. 1 to 4 are given the same reference numerals. Accordingly, detailed descriptions thereof are omitted.

In the second embodiment, connecting parts 9, which connect the sub-panels 2, 3, 4, 5 to the main panel 1, are structured to be pivotally movable around a point as an axis, as shown in the enlarged cross-partial view of FIG. 6. In other words, a ball joint functioning as the connecting part 9 is formed by ball holders 9a mounted on the side of the main panel 1 and the case 7 and a ball 9b mounted on the side of the sub-panel.

With the ball joint structure described above, the free end side of the sub-panel shown in FIG. 6 can be made to pivotally move in up and down directions as shown by the arrows A and B, and in left and right directions and can be made to rotate.

FIG. 5 shows an example in which one sub-panel from among the sub-panels that are spread out horizontally, a sub-panel 5, is rotated by about 45 degrees. The ball holder 9a holds the ball 9b with a suitable resistance to keep the sub-panels in a position reached through the pivotal movement around a point as an axis.

In the second embodiment shown in FIG. 5 and FIG. 6, because each sub-panel can pivotally move around a point as an axis by using the ball joint as the connecting part 6, the position of each sub-panel can be changed more freely. Therefore, the type of illumination can be optionally selected to be direct illumination, indirect illumination, or the like, thereby achieving the aforementioned unique operation effect.

The embodiments described above describe examples in which sub-panels formed in the same rectangular shapes are supported pivotally on the four sides of the rectangular main panel via the connecting parts, but the shapes of the main panel and sub-panel are not limited to a rectangle, and any shapes such as triangle, polygon, circle, and oblong can be selected. Furthermore, the shape of the surface-emitting parts can also be optionally selected and the number of sub-panels can be suitably selected.

Furthermore, the above embodiments describe a structure in which the main panel 1 is mounted on a bottom part of the case 7 that houses the driving power source and the like, but the case 7 may be removed from the structure of the illumination device. In such a case, the surface-emitting part made up of the organic EL elements can be mounted on both surfaces of the main panel and the sub-panels, for example. Furthermore, the shape and emission color of the surface-emitting parts can be optionally selected.

In addition, as described above, a transparent electrode can be provided to each opposing electrode of the organic EL element and a single organic EL element in which many pores are formed on a metallic electrode (opposing electrode) can be used as panel that can emit light from both surfaces without mounting surface-emitting parts made up of the organic EL elements on both surfaces of the panel.

In addition to a ceiling-hung illumination device as shown in the above embodiments, the illumination device having the structure described above can be a wall-fixed type and can also be used as a light stand or a spot-light.

What is claimed is:

1. An illumination device, comprising:
   a main panel provided with a support member that supports the entire illumination device and extends in a direction substantially perpendicular to the main panel;
   at least one surface of the main panel constituting a surface-emitting part; and
   a sub-panel which is pivotally supported by the main panel via a connecting part and at least one surface of which constitutes a surface-emitting part, wherein
   the sub-panel is pivotally movable around a side or a point as an axis in relation to the main panel connected to the sub-panel via the connecting part.

2. The illumination device according to claim 1, wherein the main panel is formed in a rectangular shape with four sides supporting via the connecting parts the four sub-panels pivotally, respectively.

3. The illumination device according to claim 2, wherein the four sub-panels are each formed in a rectangular shape.

4. The illumination device according to any one of claims 1 to 3, wherein the surface-emitting part is made up of organic electro luminescence elements.

5. The illumination device according to claim 1, wherein at least one of the main panel and the sub-panel has both surfaces constituted by the surface-emitting parts.

6. The illumination device according to claim 1, wherein the main panel is provided with a case for housing a light driving power source on a back side of the surface-emitting part, and a portion of the case is provided with a support member that supports the main panel via the case so as to support the entire illumination device via the main panel.

7. The illumination device according to claim 1, wherein each of the surface-emitting parts in the main panel and the sub-panel is independently controlled to emit light.

8. The illumination device according to claim 1, wherein the connecting part has an enough resistance against a pivotal movement of the sub-panel in relation to the main panel so as to maintain a position of the sub-panel in relation to the main panel.

* * * * *